United States Patent [19]

Lorenzo et al.

[11] Patent Number: 4,789,642

[45] Date of Patent: Dec. 6, 1988

[54] METHOD FOR FABRICATING LOW LOSS CRYSTALLINE SILICON WAVEGUIDES BY DIELECTRIC IMPLANTATION

[75] Inventors: Joseph P. Lorenzo, Stow; Richard A. Soref, Newton Centre, both of Mass.

[73] Assignee: The United States of America as represented by the Secretary of the Air Force, Washington, D.C.

[21] Appl. No.: 32,810

[22] Filed: Mar. 26, 1987

[51] Int. Cl.⁴ .................... H01L 21/425; G02B 6/10
[52] U.S. Cl. ........................................ 437/24; 437/26; 350/96.12
[58] Field of Search ............... 350/96.11, 96.12, 96.13, 350/96.14; 437/24, 26

[56] References Cited

U.S. PATENT DOCUMENTS

| | | | |
|---|---|---|---|
| 3,922,062 | 11/1975 | Uchida | 350/96.12 |
| 4,002,512 | 1/1977 | Lim | 148/187 |
| 4,030,943 | 6/1977 | Lee et al. | 148/1.5 |
| 4,048,591 | 9/1977 | Auracher | 350/96.14 |
| 4,066,482 | 1/1978 | Shaw | 148/175 |
| 4,329,016 | 5/1982 | Chen | 350/96.12 |
| 4,420,873 | 12/1983 | Leonberger et al. | 29/576 E |
| 4,426,440 | 1/1984 | Thompson | 430/321 |
| 4,439,004 | 3/1984 | Hunsperger et al. | 350/96.12 |
| 4,472,020 | 9/1984 | Evanchuk | 350/96.12 |
| 4,585,299 | 4/1986 | Strain | 350/96.12 |

FOREIGN PATENT DOCUMENTS 0218406  12/1984  Japan ............................... 350/96.12

OTHER PUBLICATIONS

Rose, "High Density Optical Waveguide Array" IBM Tech. Disc. Bull., vol. 23, No. 10(1981) pp. 4453–4454.
Article entitled "Multimode 2×2 Optical Crossbar Switch", reprinted from Electronics Letters, 27th Apr. 1978, No. 9, pp. 283–284.

Primary Examiner—Olik Chaudhuri
Attorney, Agent, or Firm—Jules Jay Morris; Donald J. Singer

[57] ABSTRACT

A method of fabricating low loss silicon optical waveguides by high energy ion implantation which converts a buried region into dielectric material. The top silicon surface can them be etched or formed into waveguides that are isolated by the buried dielectric. Annealing of the top silicon layer can be used to improve optical quality and additional silicon can be added to the top surface waveguides by epitaxial growth.

22 Claims, 3 Drawing Sheets

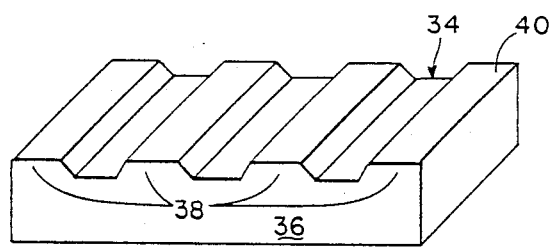
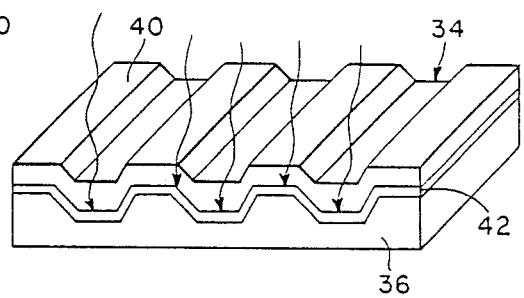
Fig. 7    Fig. 8
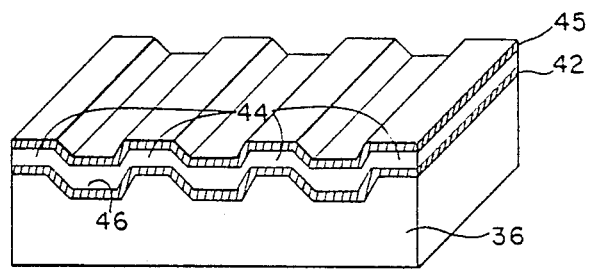
Fig. 9

METHOD FOR FABRICATING LOW LOSS CRYSTALLINE SILICON WAVEGUIDES BY DIELECTRIC IMPLANTATION

STATEMENT OF GOVERNMENT INTEREST

The invention described herein may be manufactured and used by or for the Government for governmental purposes without the payment of any royalty thereon.

BACKGROUND OF THE INVENTION

The invention relates generally to integrated optical circuits and components making up such circuits, and more particularly, to low loss single mode channel waveguides that operate at 1.3 to 1.6 micron wavelengths, or at longer wavelengths. The recent development of low loss single mode optical ibers with low dispersion at the 1.3 or 1.5 micron wavelengths has focussed attention on long wave integrated optical circuits and optical systems that couple to such fibers. Such optical circuits and systems are useful in telecommunication, data communication, optical signal processing, optical interconnection, optical sensing, and microwave antenna control applications. Semiconductor waveguides circuits are of special interest because they can provide opto-electronic integration; that is the monolithic integration of optical guided wave components with electronic circuits and with electrooptical components on a single chip.

The fundamental building block of such guided wave circuits is the channel waveguide which is used to make directional couplers, optical switches, optical modulators and optical interconnects between the various components. It is essential that optical propagation losses be kept to a minimum in such channels (less than 1 dB/cm) to allow multiple guided wave components to be cascaded on one wafer (such as in a switching network) without incurring a significant loss penalty.

Another important need is to provide channel waveguides with physically small size so that the multiple waveguides may be densely packed on a chip. In addition, the waveguide fabrication techniques should be relatively simple and should have the capability of permitting the fabrication of a wide variety of channel waveguide shapes. For example, the techniques should allow stacked three dimensional integration of waveguide components as well as planar side by side (2 dimensional) integration of components.

Two prior art waveguide fabrication techniques have been used with some success: hetero-epitaxy of III-V semiconductors and homoepitaxy of silicon on silicon.

Prior art fabrication of III-V semiconductor guided wave components for the 1.3 to 1.5 micron wavelengths suffer from the complexity of using binary, ternary, and quatenary alloy compositions of various materials, and the problems which arise from heteroepitaxy of different volatile materials upon each other. As a result, these techniques are extremely sophisticated and do nt consistently produce good quality components. Heteroepitaxy techniques being somewhat complex, are relatively expensive to apply as a manufacturing process. The use of crystalline silicon alleviates most difficulties because the waveguide core uses only a single elementary group IV material. In the past, epitaxial silicon-on-silicon waveguides have been formed into channels by dry etching. In such a procedure, a lightly doped waveguiding layer is grown on a heavily doped substrate. The refractive index of the substrate is typically 0.01 lower than the index of the epitaxial guiding layer. The problem with such a technique is that the guided-mode light tends to leak or "tail" evanescently into the heavily doped substrate because the index step between the layers is not large enough to offer tight model confinement. Moreover, the substrate tends to cause high optical losses due to the large concentration of free carriers therein. The optical propagation loss in channels fabricated with this homojunction prior art technique is therefore in the range of 10 to 15 dB/cm. Losses in this range are unacceptable for medium scale integration of guided wave components, since accummulating losses can result in loss of optical signal. It is also impractical to shrink waveguide channels made with this technique to less than 1 micron because of the optical losses which become very large due to the extremely high doping of the silicon waveguide "cladding".

It is clearly evident that there exists a need for improved optical channel waveguides which are not subject to the loss, quality and size drawbacks associated with prior art waveguides. A need also exists for improved techniques that simplify integrated optical chip manufacturing and consistently produce high quality electrooptical chips at low cost.

SUMMARY OF THE INVENTION

The needs detailed above have been somewhat addressed in our prior application Ser. No. 928,349 filed Nov. 10, 1985, (by J. P. Lorenzo and R. A. Soref) entitled "Method of Fabricating Low Loss Crystalline Silicon Waveguides". The present invention also overcomes the problems encountered in the past and provides several silicon-on-insulator fabrication techniques that offer tight optical mode confinement in arbitrarily shaped crystalline silicon core or channel waveguides. This invention provides additional flexibility in the manufacturing of integrated optical devices incorporating silicon waveguides. More specifically, the invention includes silicon-on-oxide and silicon-on-nitride fabrication techniques that make use of high energy ion implantation.

The methods of the preferred embodiments of this invention can be varied in a number of ways but all commence with the preparation of a silicon substrate having suitable doping for propagation of optical signals in the 1.3 to 1.6 micron wavelength range.

In a preferred embodiment, the silicon substrate is subjected to ion implantation to form a dielectric layer below the surface of the substrate. The substrate is then etched to provide exposed optical waveguide ribs of crystalline silicon on top of the previously formed dielectric layer. Epitaxial silicon can be added to enhance the thickness of the optical layer if needed for a particular design. A passivating layer can then be formed on top of the waveguide ribs to complete waveguide fabrication. This passivating layer can either be deposited conventionally or formed by conversion of a surface ion implant to dielectric. If carefully controlled the surface ion implant can be used to totally isolate the waveguides in dielectric.

In another embodiment of the invention, the crystalline substrate is etched to form an optical waveguide pattern prior to ion implantation. The ion implantation follows the contours of the optical waveguide pattern to provide a bounding dielectric layer beneath the Si optical waveguide. At this stage epitaxial silicon can be added to the thickness of the optical waveguide, if desired. A protective passivating layer is then formed on top of the waveguide by growth, deposition or surface ion implantation.

In yet another embodiment of the invention the crystalline silicon substrate which has been doped to provide for optical propagation is provided with an insulating layer preferably formed on its top surface. This insulating layer, which can be formed from photoresist or dielectric, is then etched or patterned to form a mask on top of the substrate. The silicon substrate is then subjected to ion implantation which forms a dielectric layer within the substrate that conforms to the pattern of the insulating layer to produce optical waveguides.

This embodiment can further comprise the step of removing the insulating layer of photoresist to produce a flat surface on top of the silicon substrate which now contains waveguides isolated by dielectric. The process can be continued by implanting a shallow dielectric layer to totally isolate the waveguides within the silicon substrate.

A shallow dielectric layer can also be formed prior to removal of the insulating layer. This second implantation will also follow the pattern established by the insulating layer and will produce a second layer of waveguide structure to provide a chip with two layers of waveguides. Finally, the insulating layer can then be removed and a level passivating layer applied to the top of the substrate to isolate the second layer of waveguides.

In the preferred embodiments of the invention, oxygen or nitrogen is used for ion implantation in order to form oxide or nitride dielectric layers.

It is therefore an object of this invention to provide a variety of fabrication techniques for making curved or straight channel waveguides of crystalline silicon having an isolating dielectric layer formed by ion implantation. It is a further object of this invention to provide waveguides which are highly transparent at 1.3 to 1.6 micron wavelengths, with optical propagation losses being much less than 1 dB per cm.

It is another object of this invention to provide simple, cost effective fabrication techniques for making a variety of waveguide structures including three dimensionally integrated (multi-layer) and planar two dimensional structures.

It is yet another object of this invention to provide channel waveguides buried in a dielectric layer of silicon oxide or silicon nitride with rib width being approximately 1 micron and waveguide height being less than 1 micron.

It is still another object of this invention to provide silicon substrates that offer monolithic integration of crystalline silicon guided wave components with electronic components and electrooptical components including optical sources and photodetectors.

BRIEF DESCRIPTION OF THE DRAWINGS

The foregoing objects and other advantages of the invention will be apparent from the following more particular description of the preferred embodiments of the invention, as illustrated in the accompanying drawings, in which like reference characters refer to the same parts throughout the different views. The drawings are not necessarily to scale, emphasis instead being placed upon illustrating the principles of the invention.

FIGS. 7 through 9 are perspective views of another process for the manufacturing of silicon waveguides that incorporates the principles of this invention;

DETAILED DESCRIPTION OF THE INVENTION

Figure 1:
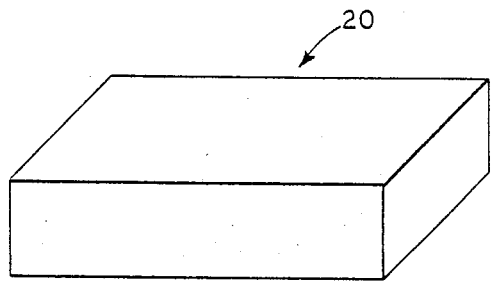
FIGS. 1 through 4 are perspective views of a process for forming silicon waveguides that incorporates the principles of this invention.

The present invention overcomes the problems encountered in the past by providing silicon-on-oxide and silicon-on-nitride fabrication techniques that offer tight optical mode confinement in silicon channel waveguides. High energy (for example, 1 MeV) ionized oxygen or nitrogen species are implanted in a crystalline silicon substrate in order to convert a buried layer of silicon into silicon dielectric compounds such as $SiO_2$ (silicon oxide) or $Si_3N_4$ (silicon nitride). The depth and thickness of the buried dielectric layer is controlled by the implant energy and ion flux, which produces dielectric layers typically 0.5 to 1 micron thick below the surface of the silicon substrate. The dielectric has the desired properties of high index of refraction, high reflectance and low loss that provide optical isolation of the silicon waveguide layer. Light of the 1.3 to 1.6 micron wavelengths can be conveniently propagated and guided in the isolated crystalline silicon layers. It may be necessary, however, after ion implantation to insure proper crystallinity and material properties of the crystalline silicon layer by thermal annealing of the layer. The annealing can sharpen the boundary between the dielectric and the top silicon layer and thereby improve optical quality.

Once a top silicon layer of the silicon substrate has been optically isolated in the vertical direction, additional material can be epitaxially added to increase its thickness to several microns if multimode applications are desired. This crystalline silicon material can next be geometrically patterned into a desired network of curved and straight rib channelled waveguides to give a preferred lateral confinement of optic signals. The patterning can involve wet or dry etching techniques that remove selected regions of the top silicon layer and can include a deep etch that goes all the way to the dielectric if desired. The patterning can also comprise selective oxidation by further oxygen or nitrogen ion implantation through a suitable mask for lateral isolation of the waveguide structures. Waveguides with micron sized lateral dimensions are feasible with this method of manufacture and optical propagation losses are low in the resultant channel waveguides.

Once patterned, the entire geometric structure can be laterally isolated and vertically isolated, and can be passivated by a conventional silicon oxide growth using dry oxygen or steam, as well as other common dielectric deposition techniques. By using combinations of ion implantation and conventional silicon oxidation, it is possible to construct vertically integrated crystalline silicon waveguides on two or more adjacent layers of the silicon substrate wafer. These vertically stacked guides can be integrated easily with lateral geometries to form three dimensional stacked channel waveguide structures.

In all of the processes described and detailed below the waveguides are fabricated with large refractive steps in an essentially homogenous material. The waveguides are optically isolated due to the relative refractive indexes of the crystalline silicon (3.5) and the dielectric silicon dioxide (1.46) or silicon nitride (1.96). These homogeneous silicon waveguides can be integrated with silicon electrooptic and electronic components.

Figure 2:
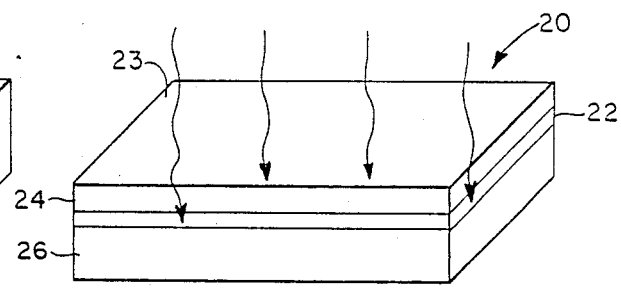
Figure 3:
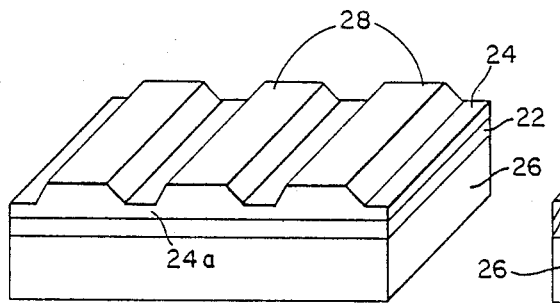

Referring now to FIG. 1, a wafer of silicon substrate 20, has been suitably doped for low loss optical propagation. Preferably the doping would range from about $10^{14}$ to $10^{16}$ cm$^{-3}$. In FIG. 2 the silicon substrate is subjected to high fluence ($10^{17}$ to $10^{19}$ cm$^{-2}$) ion implantation. The implant energy and fluence are chosen so that the converted region 22 (approximately 0.5 microns thick) is formed below the surface 23 and is sandwiched between a surface layer crystalline silicon 24 and a silicon substrate base 26. The region converted by ion implantation preferrably forms silicon dioxide or silicon nitride. In FIG. 3, the silicon surface layer 24 is patterned by wet or dry etching to provide waveguide ribs 28 which may be interconnected for signal switching and splitting.

Figure 4:
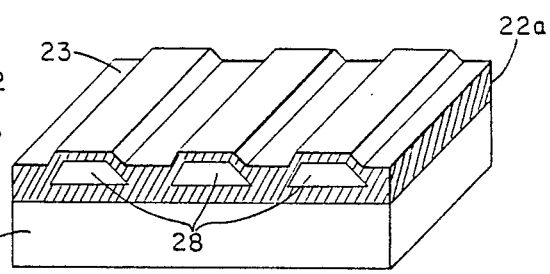

Next, as shown in FIG. 4, the exposed crystalline silicon layer 24 (FIG. 3) is subjected to a shallow ion implant or thermal oxide growth which totally isolates the waveguides 28 in dielectric 22a. It is also possible to merely cover the waveguides 28 of FIG. 3 with a passivating layer to protect them from the environment and to help increase propagation efficiency within the waveguides. Residual sections 24a (FIG. 3) between the waveguides are of insufficient height to propagate an optical signal and therefore essentially isolate the waveguides 28 (FIG. 3) from each other.

Figure 5:
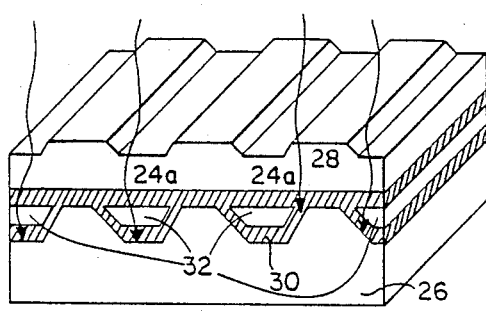
FIGS. 5 and 6 are perspective views which disclose a variation in the process of FIGS. 1–4 that permits the manufacture of a waveguide chip with two layers of waveguides.
Figure 6:
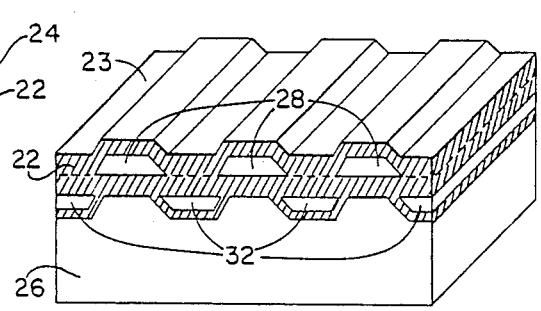

The structure shown in FIG. 3 can also be processed further in order to produce a silicon structure having two layers of waveguides. This multilayer waveguide structure is shown in FIGS. 5 and 6. The structure of FIG. 5 can be obtained from the structure of FIG. 3 by processing it with a second high energy ion implantation and conversion. This second ion implantation follows the contour of the layer 24 which has been patterned to form waveguides 28. As a result, in areas under the waveguides 28 the implant will essentially stop at the same depth as the implant of FIG. 2, however, in the shallow areas 24a between the waveguides the implant will form a deeper layer of dielectric 30 which results in the formation of a second layer of waveguides 32 under the original dielectric layer 22. As before, a surface implant or oxidation can be used to isolate the first layer waveguides 28 (FIG. 6).

An alternate method can also be used to produce the structure of FIG. 6. A deep ion implantation of the structure of FIG. 4 will result in the structure of FIG. 6. The ion implantation depth is guided by the amount of material the ions must traverse before they are arrested to 15 form a layer of dielectric material. Since the contour of the surface 23 and layer 22a present a similar structure to that of FIG. 3, implantation forms a second row of waveguides 32.

FIGS. 7 through 9 show a fabrication process where the surface 34 of crystalline silicon substrate 36 has been patterned to forms pre-waveguide ridges 38 prior to other fabrication processes. The substrate 36 is then subjected to ion implantation as shown in FIG. 8. The ion implantation once again follows the contour of the surface 40 and causes the formation of a similarly patterned corrugated dielectric layer 42 beneath the surface of silicon wafer 34. Wet or dry processed oxides or nitrogen implantation is then used to convert the top surface of the structure to dielectric and totally enclose the silicon waveguides 44 (FIG. 9). Lateral isolation is established by the narrowness of the silicon bands 46 between the waveguides 44, the bands being insufficient to support optical propagation. Thus the waveguides are sandwiched between a top dielectric layer 45 and a lower dielectric layer 42.

Figures 10, 11:
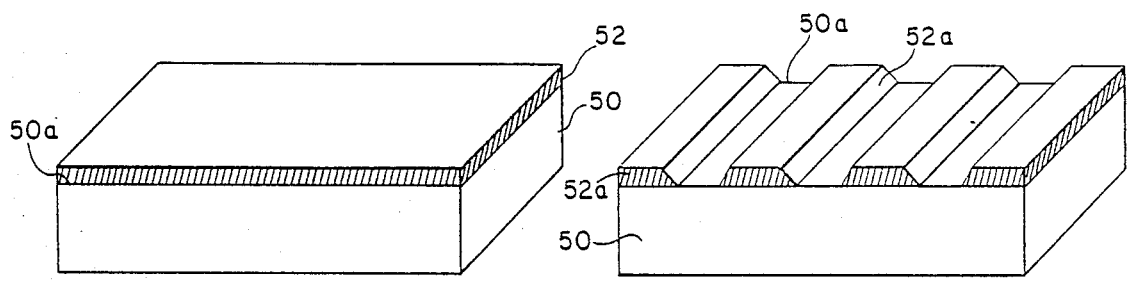
FIGS. 10 through 13 are perspective views that shows yet another process for manufacturing silicon waveguides which incorporates the principles of this invention.
Figures 12, 13:
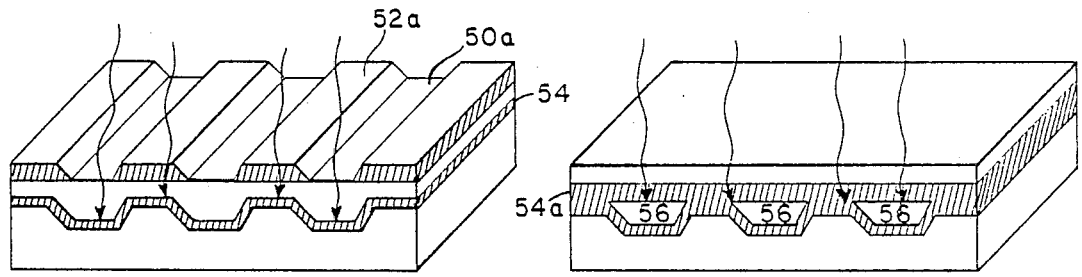

Yet another process of manufacture is shown in FIGS. 10 through 14. FIG. 10 shows a crystalline silicon substrate 50 which has a grown or deposited top dielectric layer 52. Preferrably this surface layer comprises a photoresist such as Shipley AZ1350J. The layer of photoresist 52 is then patterned to produce a surface layer comprising isolated ribs of photoresist 52a (FIG. 11). This surface layer can include curves and complex shapes. The surface layer is then used as mask for implanted ions which follow the complex contours of the surface pattern. The resultant buried layer 54 of dielectric silicon nitride or silicon oxide forms a buried dielectric layer 54 following the corrugated contour of the photoresist (FIG. 12). Note that the implant conditions can be adjusted to position the ribbed layer 54 closer to or further away from the surface 50a of the silicon wafer.

Removal of the surface masks and a second shallower implant ion and conversion produces the flat silicon structure of FIG. 13 The waveguides 56 are optically isolated within the structure by the dielectric layer 54a which has been selectively widened with the second shallower implant. Such a structure is suitable for either optical or electrooptical circuits that can be integrated with the optical waveguides 56.

Figure 14:
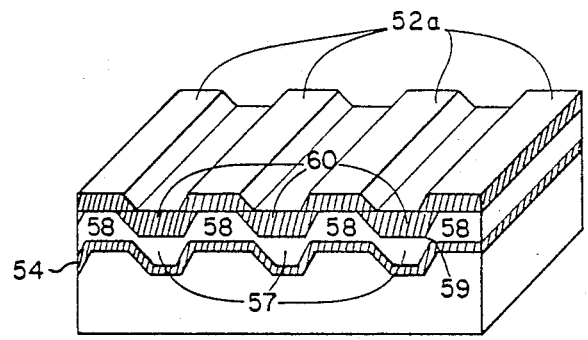
FIG. 14 is a perspective view which shows that a variation of the process shown in FIGS. 10 through 13 can produce an optical chip with two layers of waveguides.

An alternate fabrication technique can be applied to the structure of FIG. 12 to produce a multilayer structure as shown in FIG. 14. To form the structure of FIG. 14, the second shallow ion implantation and conversion are performed prior to the removal of the photoresist ribs 52a (FIG. 12). This permits the shallow second implant to follow the contour of the photoresist ribs and isolates two rows of waveguides 57 and 58. The waveguides are isolated from each other by the narrowness of the crystalline silicon ribbons 59 which separates them. The waveguides 57, 58 are sandwiched between dielectric layers 54 and a set of dielectric ribs 60 to complete their optical isolation. The photoresist 52a can now be removed and replaced with a thin flat passivating layer.

Lateral mode confinement is therefore provided by the physical step between the waveguide ribs and the interconnecting crystalline silicon (59). For example a 0.8 micron high waveguide may be isolated by a 0.2 micron connecting ribbon. Such thin ribbons are of insufficient thickness to support optical propagation. Thus the sub-micron waveguide channels are clearly feasible in crystalline silicon and may be easily isolated.

The completely isolated channel waveguides of this invention are easily feasible and facilitate the manufacture of large integrated optical circuits. A wide repetoire of waveguide shapes and structures is therefore available as illustrated in the drawings of FIGS. 1 through 14. This shows the tremendous flexibility of the silicon-on-insulator waveguide approach. Design flexibility makes such devices most useful for many electrooptical applications and makes it feasible to construct large integrated electrooptical circuits on a single silicon wafer.

While the invention has been particularly described with reference to the preferred embodiments thereof, it will be understood by those skilled in the art that various changes in substance and form can be made therein without departing from the spirit and scope of the invention as detailed in the attached claims.

We claim:

1. A method of fabricating a silicon optical waveguide comprising the steps of:
    (a) preparing a crystalline silicon substrate with suitable doping for optical propagation;
    (b) subjecting a surface of said silicon substrate to ion implantation to form a dielectric layer below the silicon substrate surface;
    (c) etching said silicon substrate at a surface to provide an exposed waveguide rib bounded by said dielectric layer; and
    (d) forming a passivating layer on top of said waveguide rib.

2. The method of fabricating a silicon optical waveguide of claim 1 further comprising the step of:
    annealing said substrate at high temperature after said ion implantation to improve optical properties of said silicon substrate.

3. The method of fabricating a silicon optical waveguide of claim 1 further comprising the step of
    adjusting the thickness of an optical propagating layer above said dielectric layer by epitaxial growth of additional silicon.

4. The method of claim 1 wherein the exposed waveguide rib is covered with a passivating layer by conversion of an ion implant at an exposed surface to a dielectric.

5. A method of fabricating a silicon optical waveguide comprising the steps of:
    (a) preparing a crystalline silicon substrate with suitable doping for optical propagation;
    (b) etching said silicon substrate at a surface to provide an optical waveguide pattern;
    (c) defining an optical waveguide from said optical waveguide pattern by ion implantation which provides a bounding dielectric layer beneath said optical waveguide; and
    (d) forming a protective passivating layer on top of said waveguide.

6. The method of fabricating a silicon optical waveguide of claim 5 further comprising the step of:
    annealing said substrate at high temperature after ion implantation to improve optical properties of said silicon substrate.

7. The method of fabricating a silicon optical waveguide of claim 5 wherein ion implantation is used to form a top passivating layer.

8. The method of fabricating a silicon optical waveguide of claim 5 further comprising the step of:
    adjusting the thickness of an optical propagating layer above said dielectric layer by epitaxial growth of additional silicon.

9. The method of fabricating a silicon optical waveguide of claim 5 wherein oxygen ions are implanted to provide said dielectric layer.

10. The method of fabricating a silicon optical waveguide of claim 5 wherein nitrogen ions are implanted to provide said dielectric layer.

11. A method of fabricating a silicon optical waveguide comprising the steps of:
    (a) preparing a crystalline silicon substrate with suitable doping for optical propagation;
    (b) forming an insulating layer on top of said crystalline silicon substrate;
    (c) patterning said insulating layer for use as an implant mask on said substrate;
    (d) subjecting said silicon substrate to ion implantation to form a dielectric layer within said substrate, said dielectric layer conforming to the topographical pattern of said insulating layer in order to form optical waveguides.

12. The method of fabricating a silicon optical waveguide of claim 9 further comprising the step of removing said insulating layer.

13. The method of fabricating a silicon optical waveguide of claim 11 further comprising the step of:
    annealing said substrate at high temperature after ion implantation to improve optical properties of said silicon substrate.

14. The method of fabricating a silicon optical waveguide of claim 12 further comprising the step of:
    adjusting the thickness of an optical propagating layer above said dielectric layer by epitaxial growth of additional silicon.

15. The method of fabricating a silicon optical waveguide of claim 11 further comprising the step of forming a shallow dielectric layer to isolate said waveguides.

16. The method of fabricating a silicon optical waveguide of claim 11 further comprising the step of forming a second dielectric layer by ion implantation in order to form an additional layer of waveguides.

17. The method of fabricating a silicon optical waveguide of claim 16 further comprising the step of removing said insulating layer.

18. The method of fabricating a silicon optical waveguide of claim 11 wherein said insulating layer comprises photoresist.

19. The method of fabricating a silicon optical waveguide of claim 15 wherein said shallow dielectric layer is formed by ion implantation.

20. The method of fabricating a silicon optical waveguide of claim 11 wherein said insulating layer is patterned by etching.

21. The method of fabricating a silicon optical waveguide of claim 11 wherein the ion implantation comprises oxygen ion implantation.

22. The method of fabricating a silicon optical waveguide of claim 11 wherein the ion implantation is nitrogen ion implantation.

* * * * *